United States Patent
Wei et al.

(10) Patent No.: US 11,801,813 B2
(45) Date of Patent: Oct. 31, 2023

(54) STABLY BRAKING SYSTEM AND METHOD USING THE SAME

(71) Applicant: AUTOMOTIVE RESEARCH & TESTING CENTER, Changhua County (TW)

(72) Inventors: Jia-Le Wei, Changhua County (TW); Tsung-Hua Hsu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 204 days.

(21) Appl. No.: 17/646,204

(22) Filed: Dec. 28, 2021

(65) Prior Publication Data

US 2023/0140481 A1    May 4, 2023

(30) Foreign Application Priority Data

Oct. 28, 2021    (TW) .................................. 110140146

(51) Int. Cl.
*B60T 8/1755*    (2006.01)
*B60T 13/68*    (2006.01)
(Continued)

(52) U.S. Cl.
CPC ...... *B60T 8/17551* (2013.01); *B60T 8/17557* (2013.01); *B60T 8/17616* (2013.01);
(Continued)

(58) Field of Classification Search
CPC ............. B60T 8/17551; B60T 8/17554; B60T 8/17557; B60T 8/176; B60T 8/1761;
(Continued)

(56) References Cited

U.S. PATENT DOCUMENTS

| | | | | |
|---|---|---|---|---|
| 4,852,009 A | * | 7/1989 | Jonner .................... | B60T 8/246 701/72 |
| 5,735,584 A | * | 4/1998 | Eckert ................. | B60W 10/184 303/140 |

(Continued)

OTHER PUBLICATIONS

Wei, et al. "A Method of Anti-Lock Braking System for Higher Braking Stability of a Three-Wheeled Motorcycle." 2021 International Automatic Control Conference (CACS) (Nov. 2021), pp. 1-6. doi: 10.1109/CACS52606.2021.9638709.

(Continued)

*Primary Examiner* — Erick R Solis
(74) *Attorney, Agent, or Firm* — Rosenberg, Klein & Lee (57) ABSTRACT

A stably braking system and a method using the same control wheels on a single axle of a ground vehicle. Firstly, at least one of a wheel deceleration and an actual slip of each of the wheels is calculated. Hydraulic control commands are generated when a braking operation is performed in response to a braking indication signal and it is detected that the wheel deceleration or the actual slip is higher. The hydraulic control commands are configured to control a hydraulic braking system to adjust the wheel speed. When the ground vehicle drives in a straight line or turns with a first pose physical quantity, the hydraulic control command with a low priority is replaced by the hydraulic control command with a high priority and the hydraulic braking system is controlled to adjust the wheel speeds based on the identical hydraulic control commands.

12 Claims, 6 Drawing Sheets

(51) Int. Cl.
  *B60T 8/1761*   (2006.01)
  *B60T 13/66*   (2006.01)
(52) U.S. Cl.
  CPC ....... *B60T 13/662* (2013.01); *B60T 2201/083* (2013.01); *B60T 2220/03* (2013.01); *B60T 2230/00* (2013.01); *B60T 2240/00* (2013.01); *B60T 2240/02* (2013.01); *B60T 2270/10* (2013.01); *B60T 2270/30* (2013.01)
(58) Field of Classification Search
  CPC ............... B60T 8/17616; B60T 13/686; B60T 2201/083; B60T 2220/03; B60T 2230/02; B60T 2240/00; B60T 2240/02; B60T 2270/10; B60T 2270/14; B60T 2270/30; B60T 2270/304
  USPC ......................................... 701/71, 72, 78–80
  See application file for complete search history.

(56) References Cited

U.S. PATENT DOCUMENTS

| | | | |
|---|---|---|---|
| 11,279,332 B2* | 3/2022 | Kato | ........................ B60T 8/176 |
| 2013/0013152 A1* | 1/2013 | Hecker | ................. B60T 8/1764 |
| | | | 701/41 |

OTHER PUBLICATIONS

Schedule for 2021 International Automatic Control Conference (CACS), Nov. 3-6, 2021, National Chung Cheng University, Chiayi, Taiwan.

* cited by examiner

STABLY BRAKING SYSTEM AND METHOD USING THE SAME

This application claims priority of Application No. 110140146 filed in Taiwan on 28 Oct. 2021 under 35 U.S.C. § 119; the entire contents of all of which are hereby incorporated by reference.

BACKGROUND OF THE INVENTION

Field of the Invention

The present invention relates to a braking technology, particularly to a stably braking system and a method using the same.

Description of the Related Art

Ground vehicles such as motorcycles or automobiles are widely used in daily life. However, the demand on braking stability is higher for ground vehicles at a high speed. Generally speaking, the higher the braking force is, the better the braking efficacy will be. However, if the braking force is higher than the grip of the tires, the braking force will cause the tire-locks, which causes the tire slip relative to the ground. The ground vehicle is thus possibly out of control.

For this reason, some companies have developed an anti-lock braking system (ABS). The ABS adjusts the brake pressure to make the brake pads inside the brake caliper quickly squeeze and release the brake disc (i.e., intermittent braking). Without ABS, the brake pads may act excessive positive clamping forces on the brake disc. Thus, ABS is necessarily equipped to prevent wheel lock-up when a ground vehicle brakes. ABS is helpful for all tires to rotate relative to the ground at a speed close to the actual moving speed of the vehicle. The applied tire forces will not exceed the boundary the road adhesion could provide. It further enables the vehicle to be controlled by the driver. Assume that a single axle of a ground vehicle is equipped with two wheels or that the ground vehicle may have multiple axles.

When a ground vehicle which is not equipped with ABS follows a straight line and then abruptly brakes the wheels, they tend to lock up as the static friction force to be used exceeds the limit value provided by the road surface.

When a ground vehicle equipped with an ABS brakes the wheels abruptly, the wheels will not be locked, but the ABS will not synchronously balance all the wheels on a single axle. Also, when it brakes inside a turn with high deceleration, the wheels on either axle may also be locked. The ground vehicle may easily deviate from the desired trajectory because the applicable tire forces no longer meet the demand for vehicle controls.

To solve the aforementioned problems and the prior art of ABS, the present invention provides a stably braking system and a method using the same.

SUMMARY OF THE INVENTION

The present invention provides a stably braking system and a method using the same, which improves the braking stability.

In an embodiment of the present invention, a stably braking system is arranged in a ground vehicle. The system includes a hydraulic braking system and an electronic control unit (ECU). The hydraulic braking system is arranged on wheels that are arranged on a single axle of the ground vehicle. The ECU is coupled to the hydraulic braking system and a dynamic sensing device. The dynamic sensing device is arranged on the ground vehicle. The ECU is configured to receive data sensed by the dynamic sensing device to calculate at least one of a wheel deceleration and an actual slip of each of the wheels. When the ECU receives a braking indication signal to perform a braking operation and detect that the wheel deceleration is higher than a first given value or that the actual slip is higher than a second given value, the ECU generates hydraulic control commands. The hydraulic control commands are configured to control the hydraulic braking system to decrease a wheel speed of each of the wheels and adjust the wheel speed of each of the wheels to be higher than 0 in a braking process. The hydraulic control commands include a pressure boosting command, a pressure holding command, or a pressure releasing command. A priority of the pressure releasing command is higher than that of the pressure holding command. A priority of the pressure holding command is higher than that of the pressure boosting command. When the ECU receives data sensed by the dynamic sensing device to detect that the ground vehicle drives in a straight line or turns with a first pose physical quantity greater than 0 and less than a third given value, the ECU replaces the hydraulic control command with a low priority by the hydraulic control command with a high priority and controls the hydraulic braking system to adjust the wheel speeds of the wheels based on the identical hydraulic control commands.

In an embodiment of the present invention, the ECU decreases a target slip of each of the wheels and controls the hydraulic braking system to adjust the actual slip of each of the wheels to follow the corresponding target slip based on the identical hydraulic control commands when the ECU receives data sensed by the dynamic sensing device to detect that the ground vehicle turns with the first pose physical quantity.

In an embodiment of the present invention, the wheels include a first wheel and a second wheel. When the ground vehicle drives in a lane and the ECU receives data sensed by the dynamic sensing device to detect that the ground vehicle turns to an inner side of the lane with a second pose physical quantity, the first wheel is close to an outer side of the lane, the second wheel is close to the inner side of the lane, and the ECU controls the hydraulic braking system to increase the wheel speed of the first wheel based on the pressure releasing command, increases a target slip of the second wheel, and controls the hydraulic braking system to adjust the actual slip of the second wheel to follow the target slip based on the pressure holding command or the pressure boosting command. Wherein, the second pose physical quantity is greater than or equal to the third given value, and the second pose physical quantity is less than a fourth given value.

In an embodiment of the present invention, the ECU replaces the hydraulic control command with a low priority by the hydraulic control command with a high priority and controls the hydraulic braking system to adjust the wheel speeds of the wheels based on the identical hydraulic control commands when the ECU receives data sensed by the dynamic sensing device to detect that the ground vehicle turns with a third pose physical quantity greater than or equal to the fourth given value.

In an embodiment of the present invention, the dynamic sensing device includes wheel speed sensors, a steering angle sensor, and a pose sensor. The wheel speed sensors are respectively arranged on the wheels and coupled to the ECU. The wheel speed sensors are configured to respectively sense the wheel speeds. The ECU is configured to receive the wheel speeds and estimate a vehicle speed of the ground vehicle according to the wheel speeds. The ECU is configured to calculate at least one of the wheel deceleration and the actual slip according to the vehicle speed and the wheel speeds. The steering angle sensor is arranged on a steering machine of the ground vehicle and coupled to the ECU. The steering angle sensor is configured to sense a steering angle of the steering machine. The pose sensor is coupled to the ECU and arranged on the ground vehicle. The pose sensor is configured to sense an actual pose physical quantity of the ground vehicle. The ECU is configured to receive the steering angle and the actual pose physical quantity, thereby detecting that the ground vehicle drives in a straight line or turns with the first pose physical quantity.

In an embodiment of the present invention, the pose sensor includes a gyroscope, an inertial measurement unit (IMU), a lean angle estimator, a lean angular velocity estimator, a yaw angle estimator, a yaw rate estimator, an accelerometer, or a combination of these.

In an embodiment of the present invention, the hydraulic braking system includes brake disks, brake calipers, and a hydraulic control unit (HCU). The brake disks are respectively arranged on the wheels and configured to respectively rotate with the wheels. The positions of the brake calipers respectively correspond to the positions of the brake disks. The HCU is coupled to the ECU and connected to the brake calipers. When the ECU detects that the ground vehicle drives in a straight line or turns with the first pose physical quantity, the ECU controls the HCU to pressurize the brake calipers based on the identical hydraulic control commands, and the brake calipers respectively clamp the brake disks to adjust the wheel speeds.

In an embodiment of the present invention, the braking indication signal is a braking voltage value, and the ECU is coupled to a braking switch of the ground vehicle and configured to receive an actual voltage value through the braking switch. When the ground vehicle turns off the braking switch, the actual voltage value is unequal to the braking voltage value. When the ground vehicle turns on the braking switch, the actual voltage value is equal to the braking voltage value.

In an embodiment of the present invention, a stably braking method controls wheels on a single axle of a ground vehicle. The method includes: calculating at least one of a wheel deceleration and an actual slip of each of wheels and generating hydraulic control commands when a braking operation is performed in response to a braking indication signal and it is detected that the wheel deceleration is higher than a first given value or that the actual slip is higher than a second given value, wherein the hydraulic control commands are configured to control a hydraulic braking system arranged on the wheels to decrease a wheel speed of each of the wheels and adjust the wheel speed of each of the wheels to be higher than 0 in a braking process, the hydraulic control commands include a pressure boosting command, a pressure holding command, or a pressure releasing command, a priority of the pressure releasing command is higher than that of the pressure holding command, and a priority of the pressure holding command is higher than that of the pressure boosting command; and when the ground vehicle drives in a straight line or turns with a first pose physical quantity greater than 0 and less than a third given value, replacing the hydraulic control command with a low priority by the hydraulic control command with a high priority and controlling the hydraulic braking system to adjust the wheel speeds of the wheels based on the identical hydraulic control commands.

In an embodiment of the present invention, a target slip of each of the wheels is decreased and the hydraulic braking system is controlled to adjust the actual slip of each of the wheels to follow the corresponding target slip based on the identical hydraulic control commands when the ground vehicle turns with the first pose physical quantity.

In an embodiment of the present invention, the wheels include a first wheel and a second wheel. When the ground vehicle drives in a lane and the ground vehicle turns to an inner side of the lane with a second pose physical quantity, the first wheel is close to an outer side of the lane, the second wheel is close to the inner side of the lane, the hydraulic braking system is controlled to increase the wheel speed of the first wheel based on the pressure releasing command, a target slip of the second wheel is increased, and the hydraulic braking system is controlled to adjust the actual slip of the second wheel to follow the target slip based on the pressure holding command or the pressure boosting command. Wherein, the second pose physical quantity is greater than or equal to the third given value, and the second pose physical quantity is less than a fourth given value.

In an embodiment of the present invention, the hydraulic control command with a low priority is replaced by the hydraulic control command with a high priority and the hydraulic braking system is controlled to adjust the wheel speeds of the wheels based on the identical hydraulic control commands when the ground vehicle turns with a third pose physical quantity greater than or equal to the fourth given value.

To summarize the contents above, the stably braking system and the method using the identical adjusts braking hydraulic pressures corresponding to all the wheels on a single axle to be equal, and therefore improves the braking stability when the ground vehicle brakes based on an antilock braking mechanism. In addition, the actual slip and the target slip of the wheel are controlled to improve the turning stability when the ground vehicle turns.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

In the following description, a stably braking system and a method using the same will be provided. The system and the method adjust braking hydraulic pressures corresponding to all wheels on a single axle to improve the braking stability when a ground vehicle brakes based on an anti-lock braking mechanism.

Figure 1:
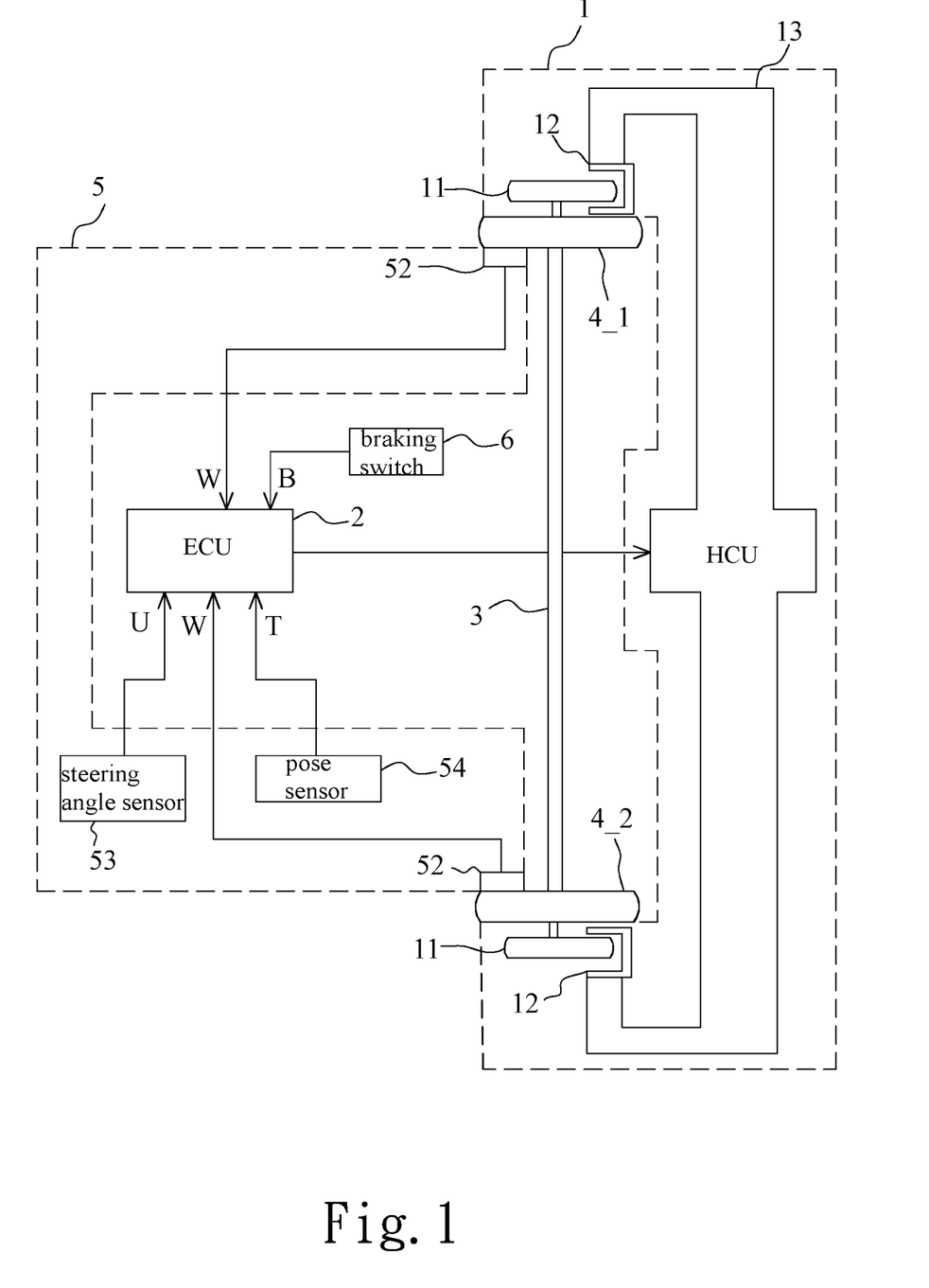
FIG. 1 is a schematic diagram illustrating a stably braking system according to an embodiment of the present invention.

FIG. 1 is a schematic diagram illustrating a stably braking system according to an embodiment of the present invention. Referring to FIG. 1, the stably braking system is arranged in a ground vehicle, such as an automobile or a motorcycle. The stably braking system includes a hydraulic braking system 1 and an electronic control unit (ECU) 2. The hydraulic braking system 1 is arranged on wheels 4_1 and 4_2 that are arranged on a single axle 3 of the ground vehicle. The ECU 2 is coupled or connected to the hydraulic braking system 1 and a dynamic sensing device 5. The dynamic sensing device 5 is arranged on the ground vehicle or the wheels 4_1 and 4_2. For convenience and clarity, the number of the wheels 4_1 and 4_2 is two. The ECU 2 may be coupled or connected to a braking switch 6 of the ground vehicle.

The operation of the stably braking system is introduced as follows. Firstly, the ECU 2 receives data sensed by the dynamic sensing device 5 to calculate at least one of the wheel deceleration and the actual slip of each of the wheels 4_1 and 4_2. When the ECU 2 receives a braking indication signal B to perform a braking operation and at least one of a first condition and a second condition is satisfied, the ECU 2 generates hydraulic control commands. The first condition defines that the wheel deceleration of each of the wheels 4_1 and 4_2 is higher than a first given value. The second condition defines that the actual slip D of each of the wheels 4_1 and 4_2 is higher than a second given value. The first given value and the second given value are set according to requirements. For example, the braking indication signal B is a braking voltage value. The ECU 2 receives an actual voltage value through the braking switch 6. When the ground vehicle turns off the braking switch 6, the actual voltage value is unequal to the braking voltage value. When the ground vehicle turns on the braking switch 6, the actual voltage value is equal to the braking voltage value. The present invention is not limited to the method of receiving the braking indication signal B. The hydraulic control commands are configured to control the hydraulic braking system 1 to decrease the wheel speed W of each of the wheels 4_1 and 4_2 and adjust the wheel speed W of each of the wheels 4_1 and 4_2 to be higher than 0 in a braking process, thereby avoiding locking the wheels 4_1 and 4_2. The hydraulic control commands include a pressure boosting command, a pressure holding command, or a pressure releasing command. The actual slip $D=(V-W)/V$, wherein V represents the vehicle speed of the ground vehicle. In other words, the ECU 2 performs an anti-lock braking mechanism when at least one of the first condition and the second condition is satisfied. In order to further improve the braking stability, the ECU 2 sets the priority of the pressure releasing command to be higher than the priority of the pressure holding command, and sets the priority of the pressure holding command to be higher than the priority of the pressure boosting command. When the ECU 2 receives data sensed by the dynamic sensing device 5 to detect that the ground vehicle drives in a straight line or turns with a first pose physical quantity greater than 0 and less than a third given value, the ECU 2 replaces the hydraulic control command with a low priority by the hydraulic control command with a high priority and controls the hydraulic braking system 1 to adjust the wheel speeds W of the wheels 4_1 and 4_2 based on the identical hydraulic control commands, thereby providing the largest braking force for all the wheels 4_1 and 4_2. When the ground vehicle is a motorcycle, the pose physical quantity is a lean angle or a lean angular velocity. The lean angle of the ground vehicle depends on the chassis of the body of the ground vehicle. When the normal vector of the chassis is vertical to the ground, the lean angle of the ground vehicle is set to 0 degree. When the lean angle keeps unchanged in unit time, the lean angular velocity is set to 0 degree/second. When the ground vehicle is an automobile, the pose physical quantity is a yaw angle or a yaw rate. The yaw angle of the ground vehicle depends on a plane parallel to the body of the ground vehicle and vertical to the ground. When the yaw angle is 0 degree, the traveling direction of the ground vehicle is vertical to the normal vector of the plane. When the yaw angle keeps unchanged in unit time, the yaw rate is set to 0 degree/second. For example, when the hydraulic control commands corresponding to the wheels 4_1 and 4_2 are respectively a pressure boosting command and a pressure holding command and the ground vehicle drives in a straight line or turns with the first pose physical quantity, the ECU 2 controls the hydraulic braking system 1 to adjust the wheel speeds W of the wheels 4_1 and 4_2 based on the pressure holding command. When the hydraulic control commands corresponding to the wheels 4_1 and 4_2 are respectively a pressure releasing command and a pressure holding command and the ground vehicle drives in a straight line or turns with the first pose physical quantity, the ECU 2 controls the hydraulic braking system 1 to adjust the wheel speeds W of the wheels 4_1 and 4_2 based on the pressure releasing command. When the hydraulic control commands corresponding to the wheels 4_1 and 4_2 are respectively a pressure releasing command and a pressure boosting command and the ground vehicle drives in a straight line or turns with the first pose physical quantity, the ECU 2 controls the hydraulic braking system 1 to adjust the wheel speeds W of the wheels 4_1 and 4_2 based on the pressure releasing command.

In order to increase the centripetal force during braking, the ECU 2 can reduce the longitudinal target slip when the ground vehicle turns. This is because each of wheels 4_1 and 4_2 has the maximum friction limit when the ground vehicle drives. The maximum friction has the longitudinal and lateral components of a vector. The maximum friction provides larger lateral friction to increase the lateral force and the centripetal force of the ground vehicle. When the ground vehicle stably turns, the ECU 2 decreases the longitudinal slip and maintains the larger lateral friction and the larger lateral force to increase the turning stability and the centripetal force. In some embodiments of the present invention, the ECU 2 decreases the target slip of each of the wheels 4_1 and 4_2 and controls the hydraulic braking system 1 to adjust the actual slip D of each of the wheels 4_1 and 4_2 to follow the corresponding target slip based on the identical hydraulic control commands when the ECU 2 receives data sensed by the dynamic sensing device 5 to detect that the ground vehicle turns with the first pose physical quantity. Preferably, the actual slip D may be less than or equal to the corresponding target slip. The actual slip D and the target slip are longitudinal slips. For example, when the original actual slip D and the original target slip of the wheel 4_1 are respectively 10% and 11%, the ECU 2 decreases the target slip of the wheel 4_1 to 7% such that the actual slip D of the wheel 4_1 is adjusted to 6%.

Figure 2:
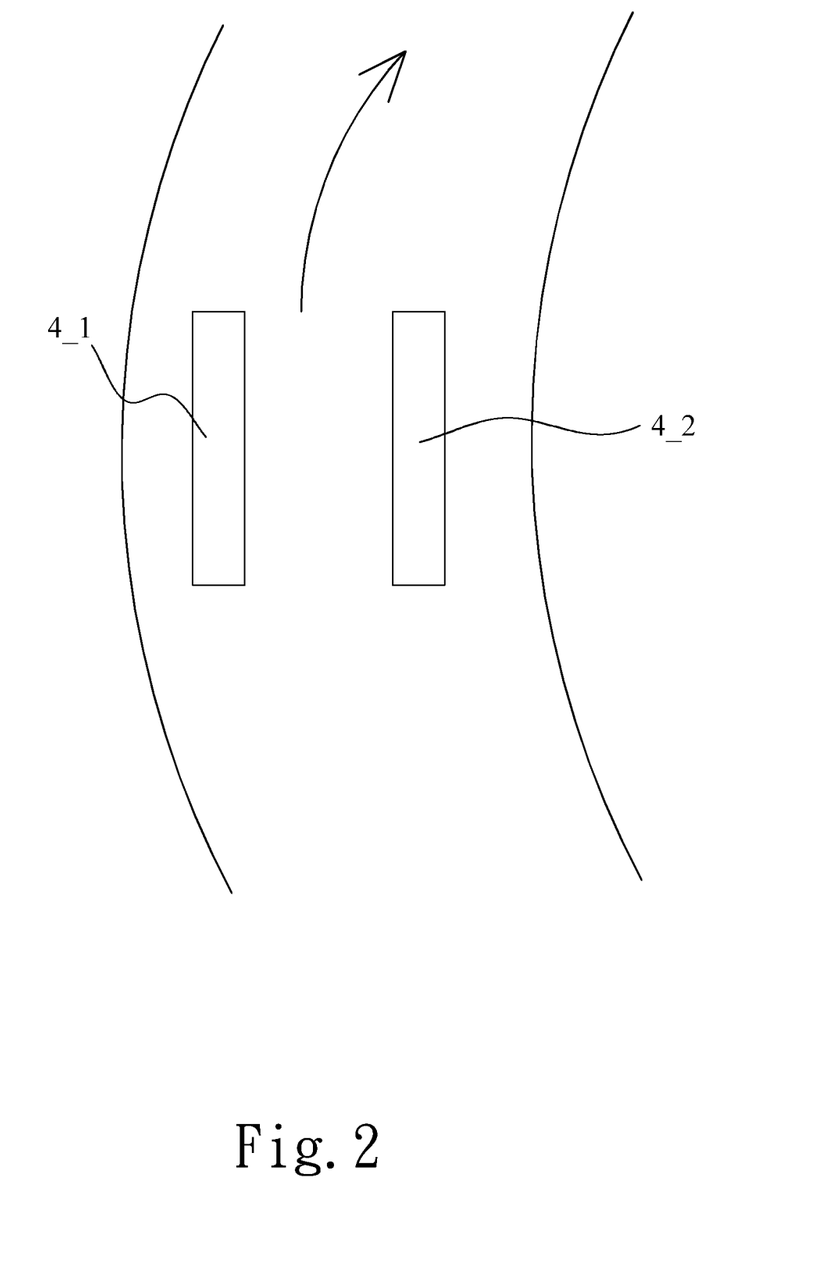
FIG. 2 is a schematic diagram illustrating two wheels on a single axle in a turning process according to an embodiment of the present invention.

FIG. 2 is a schematic diagram illustrating two wheels on a single axle in a turning process according to an embodiment of the present invention. Referring to FIG. 1 and FIG. 2, the wheel 4_1 is used as a first wheel and the wheel 4_2 is used as a second wheel. In some embodiments of the present invention, when the ground vehicle drives in a lane and the ECU 2 receives data sensed by the dynamic sensing device 5 to detect that the ground vehicle turns to the inner side of the lane with a second pose physical quantity, the first wheel is close to the outer side of the lane, the second wheel is close to the inner side of the lane, and the ECU 2 controls the hydraulic braking system 1 to increase the wheel speed W of the first wheel based on the pressure releasing command, increases the target slip of the second wheel, and controls the hydraulic braking system 1 to adjust the actual slip D of the second wheel to follow the corresponding target slip based on the pressure holding command or the pressure boosting command. Wherein, the second pose physical quantity is greater than or equal to the third given value, and the second pose physical quantity is less than a fourth given value. Preferably, the actual slip D of the second wheel may be less than or equal to the corresponding target slip. The third given value and the fourth given value are set according to requirements. The third given value and the fourth given value may be respectively 10 degrees and 50 degrees, but the present invention is not limited thereto. For example, when the original actual slip D and the original target slip of the wheel 4_2 are respectively 10% and 11%, the ECU 2 increases the target slip of the wheel 4_2 to 13%, such that the actual slip D of the wheel 4_2 is adjusted to 12%. In other words, the wheel speed W of the second wheel is decreased. The difference between the wheel speeds W of the first wheel and the second wheel can help the ground vehicle turn to the inner side of the lane, lest the ground vehicle deviate from the desired driving trajectory.

The ECU 2 replaces the hydraulic control command with a low priority by the hydraulic control command with a high priority and controls the hydraulic braking system 1 to adjust the wheel speeds W of the wheels 4_1 and 4_2 based on the identical hydraulic control commands, thereby improving the braking stability when the ECU 2 receives data sensed by the dynamic sensing device 5 to detect that the ground vehicle turns with a third pose physical quantity greater than or equal to the fourth given value.

In some embodiments of the present invention, the dynamic sensing device 5 may include wheel speed sensors 52, a steering angle sensor 53, and a pose sensor 54. The wheel speed sensors 52, the steering angle sensor 53, and the pose sensor 54 are coupled or connected to the ECU 2. The pose sensor 54 may include a gyroscope, an inertial measurement unit (IMU), a lean angle estimator, a lean angular velocity estimator, a yaw angle estimator, a yaw rate estimator, an accelerometer, or a combination of these, but the present invention is not limited thereto. The wheel speed sensors 52 are respectively arranged on the wheels 4_1 and 4_2. The steering angle sensor 53 is arranged on the steering machine of the ground vehicle. The wheel speed sensors 52 respectively sense the wheel speeds W of the wheels 4_1 and 4_2, thereby estimating the vehicle speed of the ground vehicle. The ECU 2 receives the wheel speeds W of the wheels 4_1 and 4_2 and estimates the vehicle speed of the ground vehicle according to the wheel speeds W of the wheels 4_1 and 4_2. The ECU 2 calculates at least one of the wheel deceleration and the actual slip D according to the vehicle speed of the ground vehicle and the wheel speeds W of the wheels 4_1 and 4_2. For example, the estimated vehicle speed may be a real-time average wheel speed of the wheels 4_1 and 4_2 or a reference vehicle speed. The reference vehicle speed is obtained according to a preset deceleration and the initial average wheel speed of the wheels 4_1 and 4_2. The steering angle sensor 53 senses the steering angle U of the steering machine. The pose sensor 54 senses the actual pose physical quantity T of the ground vehicle and detects that the actual pose physical quantity T is the first pose physical quantity, the second pose physical quantity, or the third pose physical quantity. The ECU 2 receives the steering angle U and the actual pose physical quantity T, thereby detecting that the ground vehicle drive in a straight line or turns with the first pose physical quantity, the second pose physical quantity, or the third pose physical quantity.

In some embodiments of the present invention, the hydraulic braking system 1 may include brake disks 11, brake calipers 12, and a hydraulic control unit (HCU) 13. The brake disks 11 are respectively arranged on the wheels 4_1 and 4_2. The positions of the brake calipers 12 respectively correspond to the positions of the brake disks 11. The HCU 13 is coupled or connected to the ECU 2 and connected to the brake calipers 12. When the ECU 2 detects that the ground vehicle drives in a straight line or turns with the first pose physical quantity, the second pose physical quantity, or the third pose physical quantity, the ECU 2 controls the HCU 13 to pressurize the brake calipers 12 based on the identical or different hydraulic control commands. Then, the brake calipers 12 respectively clamp the brake disks 11 to adjust the wheel speeds W and the actual slips D of the wheels 4_1 and 4_2 and the vehicle speed.

Figure 3:
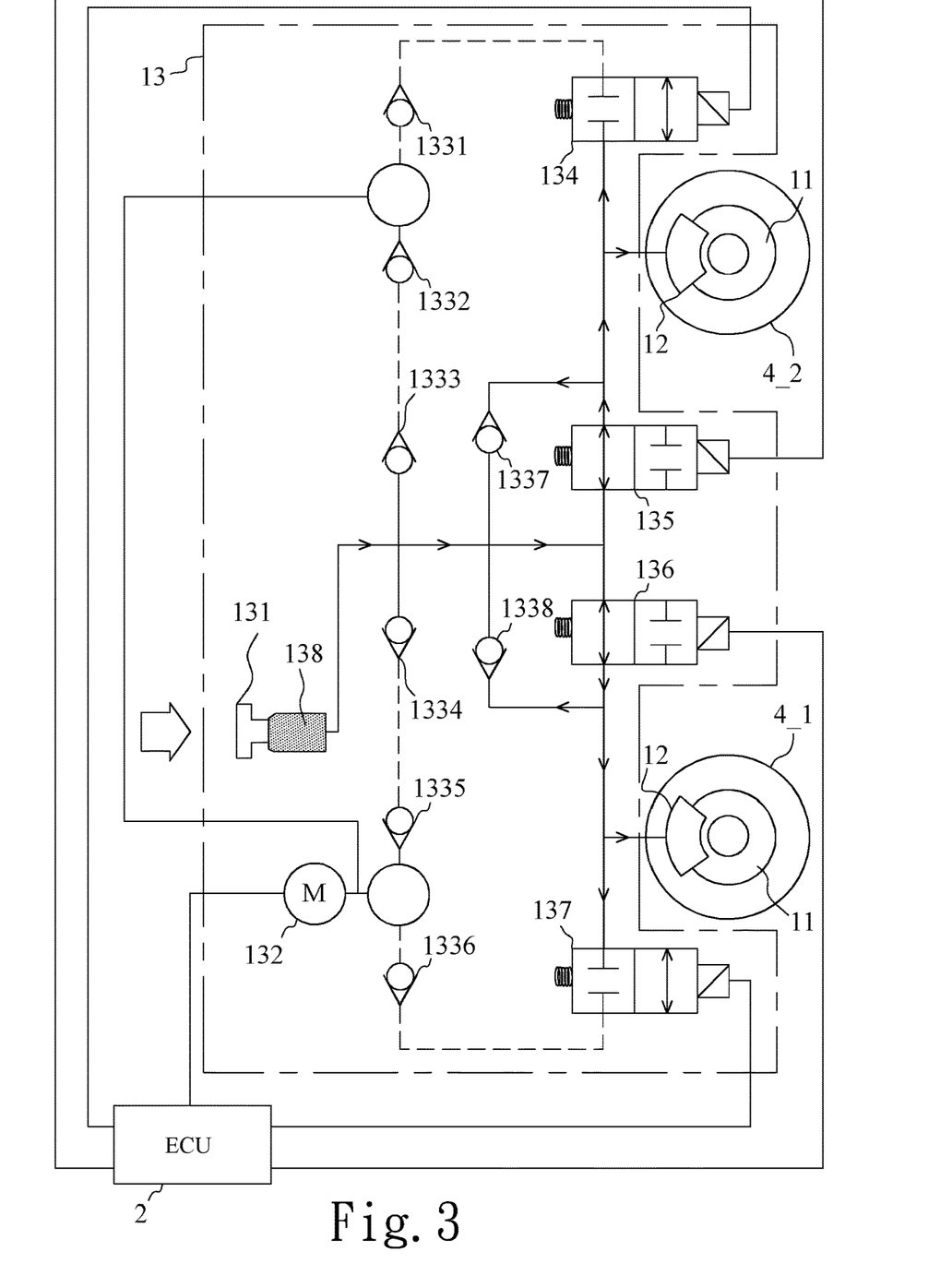
FIG. 3 is a schematic diagram illustrating a HCU performing a pressure boosting command according to an embodiment of the present invention.

FIG. 3 is a schematic diagram illustrating a HCU performing a pressure boosting command according to an embodiment of the present invention. Referring to FIG. 3, the HCU 13 may include a pressurizer 131, a motor 132, a first unidirectional valve 1331, a second unidirectional valve 1332, a third unidirectional valve 1333, a fourth unidirectional valve 1334, a fifth unidirectional valve 1335, a sixth unidirectional valve 1336, a seventh unidirectional valve 1337, an eighth unidirectional valve 1338, a first electromagnetic valve 134, a second electromagnetic valve 135, a third electromagnetic valve 136, and a fourth electromagnetic valve 137. The brake calipers 12, the pressurizer 131, the motor 132, the first unidirectional valve 1331, the second unidirectional valve 1332, the third unidirectional valve 1333, the fourth unidirectional valve 1334, the fifth unidirectional valve 1335, the sixth unidirectional valve 1336, the seventh unidirectional valve 1337, the eighth unidirectional valve 1338, the first electromagnetic valve 134, the second electromagnetic valve 135, the third electromagnetic valve 136, and the fourth electromagnetic valve 137 connected to each other through oil pipes. The pressurizer 131 has an oil room that stores braking oil 138. A solid line represents an oil path where the braking oil 138 passes. A dashed line represents an oil path where the braking oil 138 does not pass. The pressurizer 131 is connected to the third unidirectional valve 1333, the fourth unidirectional valve 1334, the seventh unidirectional valve 1337, the eighth unidirectional valve 1338, the second electromagnetic valve 135, and the third electromagnetic valve 136. The first unidirectional valve 1331 is connected to the second unidirectional valve 1332, the motor 132, and the first electromagnetic valve 134. The second unidirectional valve 1332 is connected to the motor 132 and the third unidirectional valve 1333. The third unidirectional valve 1333 is connected to the fourth unidirectional valve 1334, the seventh unidirectional valve 1337, the eighth unidirectional valve 1338, the second electromagnetic valve 135, and the third electromagnetic valve 136. The fourth unidirectional valve 1334 is connected to the fifth unidirectional valve 1335, the seventh unidirectional valve 1337, the eighth unidirectional valve 1338, the second electromagnetic valve 135, and the third electromagnetic valve 136. The fifth unidirectional valve 1335 is connected to the motor 132 and the sixth unidirectional valve 1336. The sixth unidirectional valve 1336 is connected to the motor 132 and the fourth electromagnetic valve 137. The fourth electromagnetic valve 137 is connected to the brake caliper 12, the eighth unidirectional valve 1338, the third electromagnetic valve 136, and the sixth unidirectional valve 1336. The eighth unidirectional valve 1338 is connected to the seventh unidirectional valve 1337, the second electromagnetic valve 135, and the third electromagnetic valve 136. The seventh unidirectional valve 1337 is connected to the second electromagnetic valve 135, the third electromagnetic valve 136, the brake caliper 12, and the first electromagnetic valve 134. The ECU 2 is coupled or connected to the motor 132, the first electromagnetic valve 134, the second electromagnetic valve 135, the third electromagnetic valve 136, and the fourth electromagnetic valve 137.

When the HCU 13 performs the pressure boosting command, the ECU 2 uses the second electromagnetic valve 135 and the third electromagnetic valve 136 to open the corresponding oil path, turns off the motor 132, and uses the first electromagnetic valve 134 and the fourth electromagnetic valve 137 to close the corresponding oil path. The pressurizer 131 pressurizes the braking oil 138, such that the braking oil 138 passes through the second electromagnetic valve 135 and the third electromagnetic valve 136 and increases pressures for pressurizing all the brake calipers 12. Thus, the brake calipers 12 respectively clamp the brake disks 11 to decrease the wheel speeds and the vehicle speed of all the wheels 4_1 and 4_2.

Figure 4:
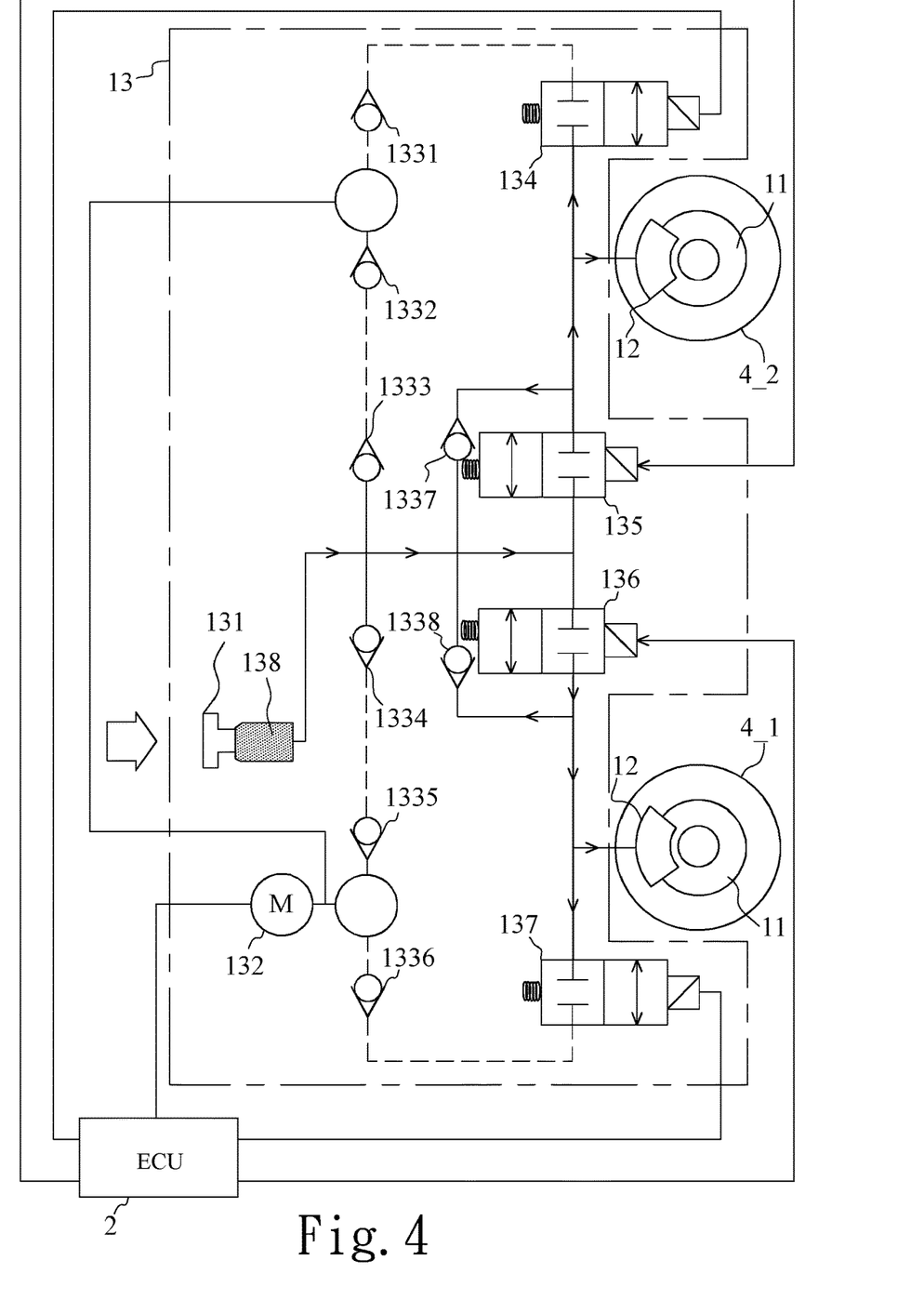
FIG. 4 is a schematic diagram illustrating a HCU performing a pressure holding command according to an embodiment of the present invention.

FIG. 4 is a schematic diagram illustrating a HCU performing a pressure holding command according to an embodiment of the present invention. Referring to FIG. 4, the ECU 2 turns off the motor 132 and uses the second electromagnetic valve 135, the third electromagnetic valve 136, the first electromagnetic valve 134, and the fourth electromagnetic valve 137 to close the corresponding oil path when the HCU 13 performs the pressure holding command. Because the braking oil 138 is confined between the first electromagnetic valve 134 and the second electromagnetic valve 135 and confined between the third electromagnetic valve 136 and the fourth electromagnetic valve 137, the braking oil 138 can maintain the pressures for pressing all the brake calipers 12. Thus, the brake calipers 12 respectively rub against the brake disks 11 to maintain the braking pressures and change the wheel speeds of the wheels 4_1 and 4_2 and the vehicle speed in response to the braking pressures.

Figure 5:
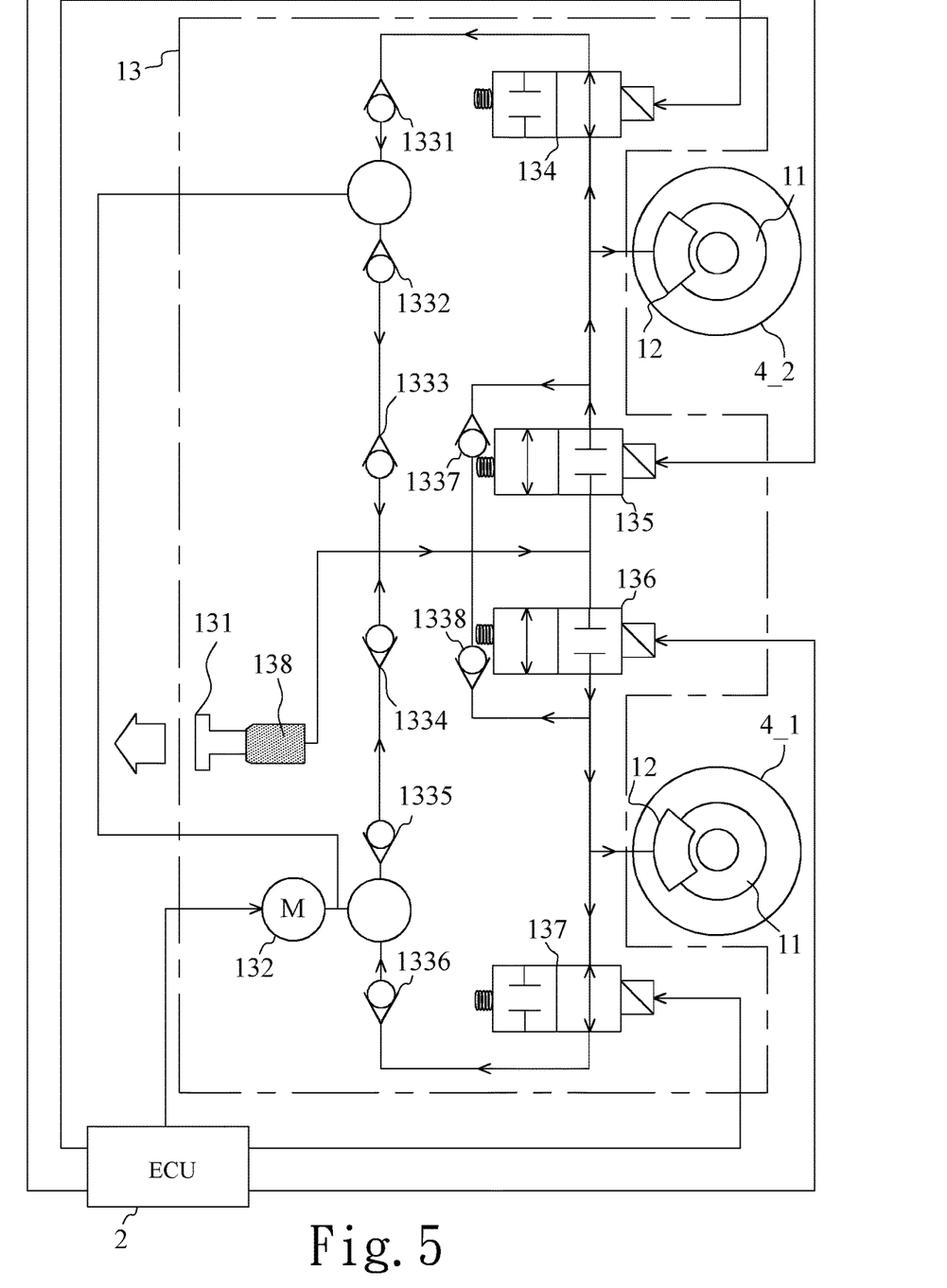
FIG. 5 is a schematic diagram illustrating a HCU performing a pressure releasing command according to an embodiment of the present invention.

FIG. 5 is a schematic diagram illustrating a HCU performing a pressure releasing command according to an embodiment of the present invention. Referring to FIG. 5, the ECU 2 turns on the motor 132, uses the first electromagnetic valve 134 and the fourth electromagnetic valve 137 to open the corresponding oil path, and uses the second electromagnetic valve 135 and the third electromagnetic valve 136 to close the corresponding oil path. The motor 132 can draw the braking oil 138 from the oil pipe to the oil room of the pressurizer 131, thereby releasing the pressurizer 131. Thus, the braking oil 138 can decrease the pressures for pressurizing all the brake calipers 12, such that all the brake calipers 12 respectively clamp all the brake disks 11 to decrease the braking pressure and increase the wheel accelerations of all the wheels 4_1 and 4_2. As a result, the braking oil 138 can pass through the first electromagnetic valve 134, the fourth electromagnetic valve 137, the first unidirectional valve 1331, the second unidirectional valve 1332, the third unidirectional valve 1333, the fourth unidirectional valve 1334, the fifth unidirectional valve 1335, the sixth unidirectional valve 1336, the seventh unidirectional valve 1337, and the eighth unidirectional valve 1338.

The ECU 2 can generate the different hydraulic control commands to change the wheel speeds W of the wheels 4_1 and 4_2. When the wheel speed W of the wheel 4_1 changes in response to the pressure boosting command, the ECU 2 uses the third electromagnetic valve 136 to open the corresponding oil path, turns off the motor 132, and uses the fourth electromagnetic valve 137 to close the corresponding oil path. When the wheel speed W of the wheel 4_1 changes in response to the pressure holding command, the ECU 2 turns off the motor 132 and uses the third electromagnetic valve 136 and the fourth electromagnetic valve 137 to close the corresponding oil path. When the wheel speed W of the wheel 4_1 changes in response to the pressure releasing command, the ECU 2 turns on the motor 132, uses the fourth electromagnetic valve 137 to open the corresponding oil path, and uses the third electromagnetic valve 136 to close the corresponding oil path. When the wheel speed W of the wheel 4_2 changes in response to the pressure boosting command, the ECU 2 turns on the second electromagnetic valve 135 and turns off the motor 132 and the first electromagnetic valve 134. When the wheel speed W of the wheel 4_2 changes in response to the pressure holding command, the ECU 2 turns off the motor 132 and uses the second electromagnetic valve 135 and the first electromagnetic valve 134 to close the corresponding oil path. When the wheel speed W of the wheel 4_2 changes in response to the pressure releasing command, the ECU 2 turns on the motor 132, uses the first electromagnetic valve 134 to open the corresponding oil path, and uses the second electromagnetic valve 135 to close the corresponding oil path.

Figure 6:
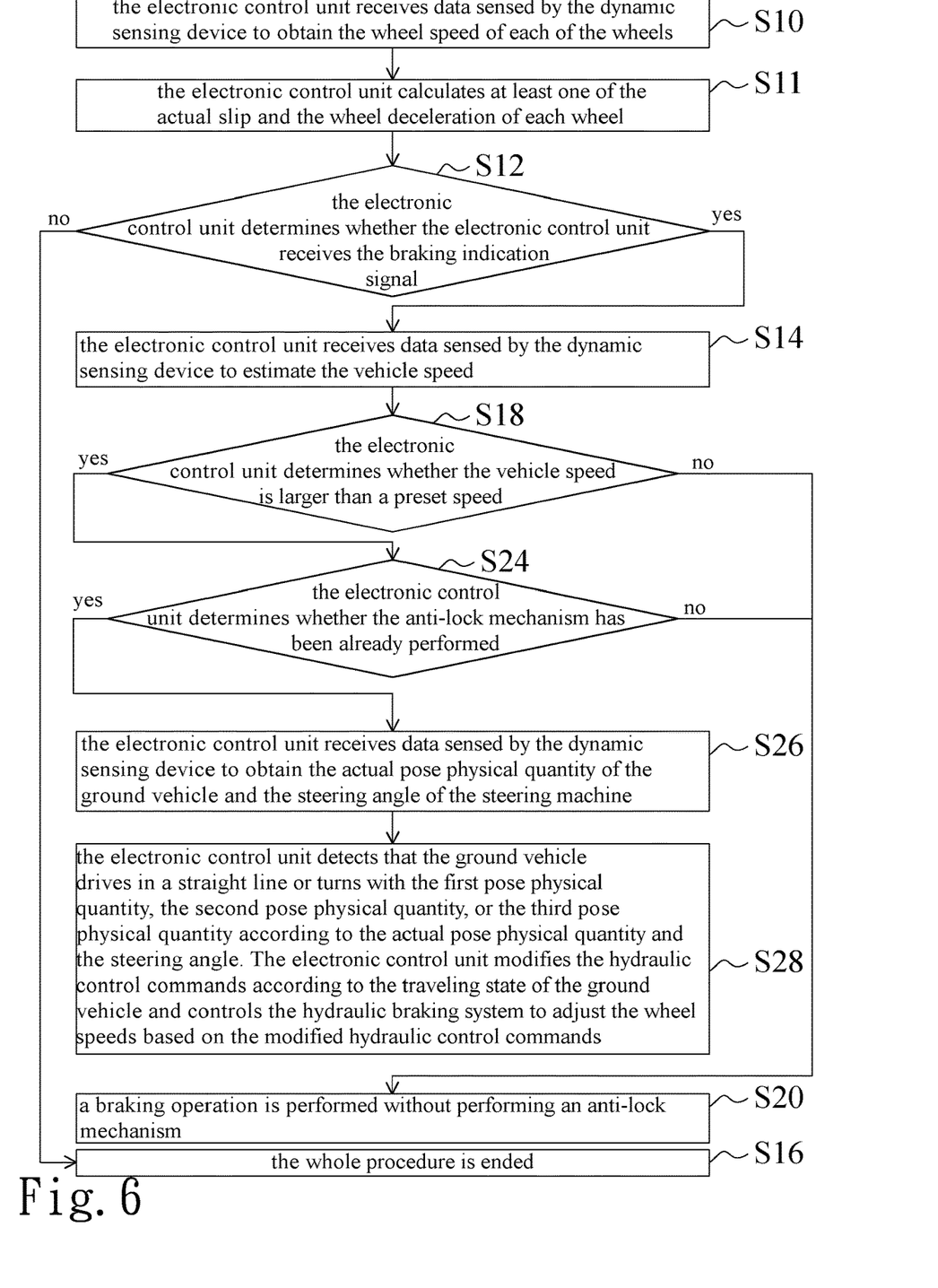
FIG. 6 is a flowchart of a stably braking method according to an embodiment of the present invention.

FIG. 6 is a flowchart of a stably braking method according to an embodiment of the present invention. Referring to FIG. 1 and FIG. 6, the stably braking method of the present invention is introduced as follows. Firstly, in Step S10, the ECU 2 receives data sensed by the dynamic sensing device 5 to obtain the wheel speed W of each of the wheels 4_1 and 4_2. Then, in Step S11, the ECU 2 calculates at least one of the actual slip D and the wheel deceleration of each of the wheels 4_1 and 4_2. In Step S12, the ECU 2 determines whether the ECU 2 receives the braking indication signal B. If the result is yes, the procedure proceeds to Step S14. If the result is no, the procedure proceeds to Step S16. In Step S16, the whole procedure is ended. In Step S14, the ECU 2 controls the dynamic sensing device 5 to estimate the vehicle speed. After Step S14, Step S18 is performed. In Step S18, the ECU 2 determines whether the vehicle speed is larger than a preset speed, such as 10 km/hr. If the result is no, the procedure proceeds to Step S20. If the result is yes, the procedure proceeds to Step S24. In Step S20, a braking operation is performed without performing an anti-lock mechanism. In Step S24, the ECU 2 determines whether the anti-lock mechanism has been already performed. If the result is no, the procedure proceeds to Step S20. If the result is yes, the procedure proceeds to Step S26. For example, when the wheel deceleration of each of the wheels 4_1 and 4_2 is higher than the first given value or the actual slip D of each of the wheels 4_1 and 4_2 is higher than the second given value, the ECU 2 determines that the anti-lock mechanism has been already performed. When the wheel deceleration of each of the wheels 4_1 and 4_2 is not higher than the first given value or the actual slip D of each of the wheels 4_1 and 4_2 is not higher than the second given value, the ECU 2 detects that the anti-lock mechanism is not performed. In Step S26, the ECU 2 receives data sensed by the dynamic sensing device 5 to obtain the actual pose physical quantity T of the ground vehicle and the steering angle U of the steering machine. Finally, in Step S28, the ECU 2 detects that the ground vehicle drives in a straight line or turns with the first pose physical quantity, the second pose physical quantity, or the third pose physical quantity according to the actual pose physical quantity T of the ground vehicle and the steering angle U of the steering machine. Besides, the ECU 2 modifies the hydraulic control commands according to the traveling state of the ground vehicle and controls the hydraulic braking system 1 to adjust the wheel speed W of each of the wheels 4_1 and 4_2 based on the modified hydraulic control commands.

According to the embodiments provided above, the stably braking system and the method using the same adjust braking hydraulic pressures corresponding to all wheels on a single axle to be equal, thereby improving the braking stability when the ground vehicle brakes based on an anti-lock braking mechanism. In addition, the actual slip and the target slip of the wheel are controlled to improve the turning stability when the ground vehicle turns.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A stably braking system, arranged in a ground vehicle, comprising:
   a hydraulic braking system arranged on wheels that are arranged on a single axle of the ground vehicle; and
   an electronic control unit (ECU) coupled with the hydraulic braking system and a dynamic sensing device, wherein the dynamic sensing device is arranged on the ground vehicle, the ECU is configured to receive data sensed by the dynamic sensing device to calculate at least one of a wheel deceleration and an actual slip of each of the wheels, when the ECU receives a braking indication signal to perform a braking operation and detect that the wheel deceleration is higher than a first given value or that the actual slip is higher than a second given value, the ECU generates hydraulic control commands;
   wherein the hydraulic control commands are configured to control the hydraulic braking system to decrease a wheel speed of each of the wheels and adjust the wheel speed of each of the wheels to be higher than 0 in a braking process, the hydraulic control commands include a pressure boosting command, a pressure holding command, or a pressure releasing command, a priority of the pressure releasing command is higher than that of the pressure holding command, and a priority of the pressure holding command is higher than that of the pressure boosting command;
   wherein when the ECU receives data sensed by the dynamic sensing device to detect that the ground vehicle drives in a straight line or turns with a first pose physical quantity greater than 0 and less than a third given value, the ECU replaces the hydraulic control command with a low priority by the hydraulic control command with a high priority and controls the hydraulic braking system to adjust the wheel speeds of the wheels based on the identical hydraulic control commands.

2. The stably braking system according to claim 1, wherein the ECU decreases a target slip of each of the wheels and controls the hydraulic braking system to adjust the actual slip of each of the wheels to follow the corresponding target slip based on the identical hydraulic control commands when the ECU receives data sensed by the dynamic sensing device to detect that the ground vehicle turns with the first pose physical quantity.

3. The stably braking system according to claim 1, wherein the wheels include a first wheel and a second wheel, when the ground vehicle drives in a lane and the ECU receives data sensed by the dynamic sensing device to detect that the ground vehicle turns to an inner side of the lane with a second pose physical quantity, the first wheel is close to an outer side of the lane, the second wheel is close to the inner side of the lane, and the ECU controls the hydraulic braking system to increase the wheel speed of the first wheel based on the pressure releasing command, increases a target slip of the second wheel, and controls the hydraulic braking system to adjust the actual slip of the second wheel to follow the target slip based on the pressure holding command or the pressure boosting command, wherein the second pose physical quantity is greater than or equal to the third given value, and the second pose physical quantity is less than a fourth given value.

4. The stably braking system according to claim 3, wherein the ECU replaces the hydraulic control command with a low priority by the hydraulic control command with a high priority and controls the hydraulic braking system to adjust the wheel speeds based on the identical hydraulic control commands when the ECU receives data sensed by the dynamic sensing device to detect that the ground vehicle turns with a third pose physical quantity greater than or equal to the fourth given value.

5. The stably braking system according to claim 1, wherein the dynamic sensing device includes:
wheel speed sensors respectively arranged on the wheels and coupled to the ECU, wherein the wheel speed sensors are configured to respectively sense the wheel speeds, the ECU is configured to receive the wheel speeds and estimate a vehicle speed of the ground vehicle according to the wheel speeds, and the ECU is configured to calculate at least one of the wheel deceleration and the actual slip according to the vehicle speed and the wheel speeds;
a steering angle sensor arranged on a steering machine of the ground vehicle and coupled to the ECU, wherein the steering angle sensor is configured to sense a steering angle of the steering machine; and
a pose sensor coupled to the ECU and arranged on the ground vehicle, wherein the pose sensor is configured to sense an actual pose physical quantity of the ground vehicle, and the ECU is configured to receive the steering angle and the actual pose physical quantity, thereby detecting that the ground vehicle drives in a straight line or turns with the first pose physical quantity.

6. The stably braking system according to claim 5, wherein the pose sensor includes a gyroscope, an inertial measurement unit (IMU), a lean angle estimator, a lean angular velocity estimator, a yaw angle estimator, a yaw rate estimator, an accelerometer, or a combination of these.

7. The stably braking system according to claim 1, wherein the hydraulic braking system includes:
brake disks respectively arranged on the wheels and configured to respectively rotate with the wheels;
brake calipers whose positions respectively corresponding to positions of the brake disks; and
a hydraulic control unit (HCU) coupled to the ECU and connected to the brake calipers, wherein when the ECU detects that the ground vehicle drives in a straight line or turns with the first pose physical quantity, the ECU controls the HCU to pressurize the brake calipers based on the identical hydraulic control commands, and the brake calipers respectively clamp the brake disks to adjust the wheel speeds.

8. The stably braking system according to claim 1, wherein the braking indication signal is a braking voltage value, the ECU is coupled to a braking switch of the ground vehicle and configured to receive an actual voltage value through the braking switch, when the ground vehicle turns off the braking switch, the actual voltage value is unequal to the braking voltage value, and when the ground vehicle turns on the braking switch, the actual voltage value is equal to the braking voltage value.

9. A stably braking method controlling wheels on a single axle of a ground vehicle, and the method comprising:
calculating at least one of a wheel deceleration and an actual slip of each of the wheels and generating hydraulic control commands when a braking operation is performed in response to a braking indication signal and it is detected that the wheel deceleration is higher than a first given value or that the actual slip is higher than a second given value, wherein the hydraulic control commands are configured to control a hydraulic braking system arranged on the wheels to decrease a wheel speed of each of the wheels and adjust the wheel speed of each of the wheels to be higher than 0 in a braking process, the hydraulic control commands include a pressure boosting command, a pressure holding command, or a pressure releasing command, a priority of the pressure releasing command is higher than that of the pressure holding command, and a priority of the pressure holding command is higher than that of the pressure boosting command; and
when the ground vehicle drives in a straight line or turns with a first pose physical quantity greater than 0 and less than a third given value, replacing the hydraulic control command with a low priority by the hydraulic control command with a high priority and controlling the hydraulic braking system to adjust the wheel speeds of the wheels based on the identical hydraulic control commands.

10. The stably braking method according to claim 9, wherein a target slip of each of the wheels is decreased and the hydraulic braking system is controlled to adjust the actual slip of each of the wheels to follow the corresponding target slip based on the identical hydraulic control commands when the ground vehicle turns with the first pose physical quantity.

11. The stably braking method according to claim 9, wherein the wheels include a first wheel and a second wheel, when the ground vehicle drives in a lane and the ground vehicle turns to an inner side of the lane with a second pose physical quantity, the first wheel is close to an outer side of the lane, the second wheel is close to the inner side of the lane, the hydraulic braking system is controlled to increase the wheel speed of the first wheel based on the pressure releasing command, a target slip of the second wheel is increased, and the hydraulic braking system is controlled to adjust the actual slip of the second wheel to follow the target slip based on the pressure holding command or the pressure boosting command, wherein the second pose physical quantity is greater than or equal to the third given value, and the second pose physical quantity is less than a fourth given value.

12. The stably braking method according to claim 11, wherein the hydraulic control command with a low priority is replaced by the hydraulic control command with a high priority and the hydraulic braking system is controlled to adjust the wheel speeds based on the identical hydraulic control commands when the ground vehicle turns with a third pose physical quantity greater than or equal to the fourth given value.

* * * * *